US012792801B2

(12) United States Patent
Del Pin et al.

(10) Patent No.: US 12,792,801 B2
(45) Date of Patent: Nov. 10, 2026

(54) METHODS AND SYSTEMS FOR REPRESENTING FLUID-STRUCTURE INTERACTION INTERFACE WITH PARTICLES

(71) Applicant: Synopsys, Inc., Sunnyvale, CA (US)

(72) Inventors: Facundo Del Pin, Alameda, CA (US); Chi-Hsien Wang, Pleasanton, CA (US)

(73) Assignee: Synopsys, Inc., Sunnyvale, CA (US)

( * ) Notice: Subject to any disclaimer, the term of this patent is extended or adjusted under 35 U.S.C. 154(b) by 1273 days.

(21) Appl. No.: 17/498,106

(22) Filed: Oct. 11, 2021

(65) Prior Publication Data

US 2022/0027540 A1 Jan. 27, 2022

Related U.S. Application Data

(60) Provisional application No. 63/240,800, filed on Sep. 3, 2021.

(51) Int. Cl.

*G06F 30/28* (2020.01)
*G06F 30/23* (2020.01)
*G06F 30/25* (2020.01)
*G06F 113/08* (2020.01)

(52) U.S. Cl.

CPC .............. *G06F 30/28* (2020.01); *G06F 30/23* (2020.01); *G06F 30/25* (2020.01); *G06F 2113/08* (2020.01)

(58) Field of Classification Search

CPC .......... G06F 30/28; G06F 30/23; G06F 30/25; G06F 2113/08

See application file for complete search history.

(56) References Cited

U.S. PATENT DOCUMENTS

2003/0125644 A1* 7/2003 Hamamoto ............. G06F 30/23 600/587
2010/0204963 A1* 8/2010 Shapiro ................... G06F 30/23 703/1
2011/0288834 A1* 11/2011 Yamazaki .............. G06F 30/28 703/2

OTHER PUBLICATIONS

Idelsohn et al., Fluid-structure interaction using the particle finite element method, 2006, Elsevier, pp. 2100-2123 (Year: 2006).*
Abbey, FEA Loading Tips, Feb. 1, 2014, Digital Engineering, pp. 1-12 (Year: 2014).*

* cited by examiner

*Primary Examiner* — Ryan F Pitaro
*Assistant Examiner* — Bernard E Cothran
(74) *Attorney, Agent, or Firm* — FBT Gibbons LLP

(57) ABSTRACT

A structure model representing a physical object, a fluid model representing a fluid domain, and a set of particles representing a fluid-structure interaction (FSI) interface between the fluid model and the structure model are received in a computer system. Fluid behaviors of the fluid domain are simulated using the fluid model. Respective friction and pressure forces are calculated at the set of particles of the FSI interface. Each particle's friction and pressure forces are calculated from the simulated fluid behaviors and each particle's location in the fluid model. Structural behaviors of the physical object are simulated using the structure model in response to the friction and pressure forces at the set of particles on the FSI interface. The simulated structural behaviors update each particle's location. The updated location is used in the subsequent calculations of the friction and pressure forces.

10 Claims, 20 Drawing Sheets

920

METHODS AND SYSTEMS FOR REPRESENTING FLUID-STRUCTURE INTERACTION INTERFACE WITH PARTICLES

CROSS-REFERENCE TO RELATED APPLICATIONS

This application claims benefits of U.S. Provisional Patent Application Ser. No. 63/240,800 for "METHODS AND SYSTEMS FOR REPRESENTING FLUID-STRUCTURE INTERACTION INTERFACE WITH PARTICLES" filed Sep. 3, 2021. The contents of which are hereby incorporated by reference in its entirety for all purposes.

FIELD

The subject matter described herein relates to computer-aided engineering analysis (CAE), more particularly to methods and systems for representing fluid-structure interaction interface with particles.

BACKGROUND

Fluid-structure interaction (FSI) is the interaction of some movable or deformable structure with an internal or surrounding fluid flow. FSI simulations help engineers and designers predict the behavior of coupled problems in a wide range of industries from automotive to healthcare. For example, FSI can be used for designing automobiles, aircrafts, engines, bridges, etc. FSI can also be used in modeling of manufacturing process of healthcare products.

Two main approaches exist for simulations of FSI: a) monolithic approach: the equations governing the flow and the displacement of the structure are solved simultaneously, with a single solver; and b) partitioned approach: the equations governing the flow and the displacement of the structure are solved separately, with two distinct solvers. The partitioned approach facilitates solution of the flow equations and the structural equations with different, possibly more efficient techniques which have been developed specifically for either flow equations or structural equations.

In order to use the partitioned approach, FSI interface needs to be properly tracked during simulation. Generally, FSI interface tracking can be done with a body-fitted mesh. However, solution instability may occur when a physical system containing complex material models with extreme deformations results in multiple contact points between fluid and structure.

SUMMARY

Methods and systems for representing fluid-structure interaction interface based with particles are disclosed. In one aspect, a structure model representing a physical object, a fluid model representing a fluid domain, and a set of particles representing a fluid-structure interaction (FSI) interface between the fluid model and the structure model are received in a computer system. Fluid behaviors of the fluid domain are simulated using the fluid model. Respective friction and pressure forces are calculated at the set of particles of the FSI interface. Each particle's friction and pressure forces are calculated from the simulated fluid behaviors and each particle's location in the fluid model. Structural behaviors of the physical object are simulated using the structure model in response to the friction and pressure forces at the set of particles on the FSI interface. The simulated structural behaviors update each particle's location. The updated location is used in the subsequent calculations of the friction and pressure forces.

In another aspect, the particles are initially inactive. The particles are activated before simulated fluid behaviors are obtained. A wall boundary condition at particles is included in the simulated fluid behaviors. The particles are deactivated after the friction and pressure forces are transferred to a set of nodal forces on the FSI interface before obtaining simulated structural behaviors of the physical object.

According to this disclosure, one of the objects is to improve simulations of FSI especially for simulations of FSI experiencing solution instability due to various factors including, but not limited to, extreme deformations resulted into multiple contact points between structural parts. Many unsolvable FSI problems or simulations can be solved with the techniques disclosed herein. Simulation results may be used for adjusting physical product manufacturing setup that interacts with fluid, for example, certain feminine hygiene products require folding very thin paper with air flow.

DETAILED DESCRIPTION

Systems and methods are disclosed for representing fluid-structure interaction (FSI) interface with particles. Each particle is defined by a location and a radius, for example, a particle based on discrete element method. A fluid domain can be represented by a fluid model (e.g., finite element analysis model or finite volume model). A physical object (e.g., a structure) can be represented by a structure model (e.g., finite element analysis model). The fluid domain can locate outside of the physical object (i.e., surrounding fluid). The fluid domain can also locate inside of the physical object (i.e., internal fluid). Fluid domain can be a gas or liquid. A set of particles representing an FSI interface are located on an outer surface of the structure model. The locations of particles are predetermined, for example, predefined locations in each finite element formed the FSI interface. One or more finite elements form the FSI interface can include one-dimensional element (e.g., beam or truss element) or two-dimensional element (e.g., shell elements). There can be one or more predefined locations for each finite element. Friction and pressure forces on each particle can be calculated based on the current location of each particle from fluid behaviors obtained in a simulation based on the fluid model. The friction and pressure forces are then converted to a set of nodal forces for the structure model. Structural behaviors of the physical object subject to the set of nodal forces can then be simulated based on the structure model. The simulated structural behaviors include updated locations of the particles. The updated locations are used as the current locations for subsequent calculations of the friction and pressure forces. The simulations of the FSI continues with repeating a simulation of the fluid domain following by a simulation of the physical object. The set of particles representing the FSI interface transfers the friction and pressure forces from the fluid simulation to the structure simulation. Then the locations of the set of particles are updated in the structure simulation. Another friction and pressure forces can then be calculated based on the updated locations.

A Computational Fluid Dynamics (CFD) domain (i.e., a fluid domain) is the portion of space where the solution of the CFD simulation is calculated. The computational domain needs to be discretized into a computational grid (or mesh) to solve the discretized equations of fluid flows. In external aerodynamics, a CFD simulations of the flow around a geometrical object ("geometry") is required, therefore the computational domain is a volume of adequate dimensions around the geometry of interest. Meanwhile, in internal flows, the computational domain is defined by the confines of the geometry itself and the space inside the geometry is discretized into a computational grid.

Figure 1:
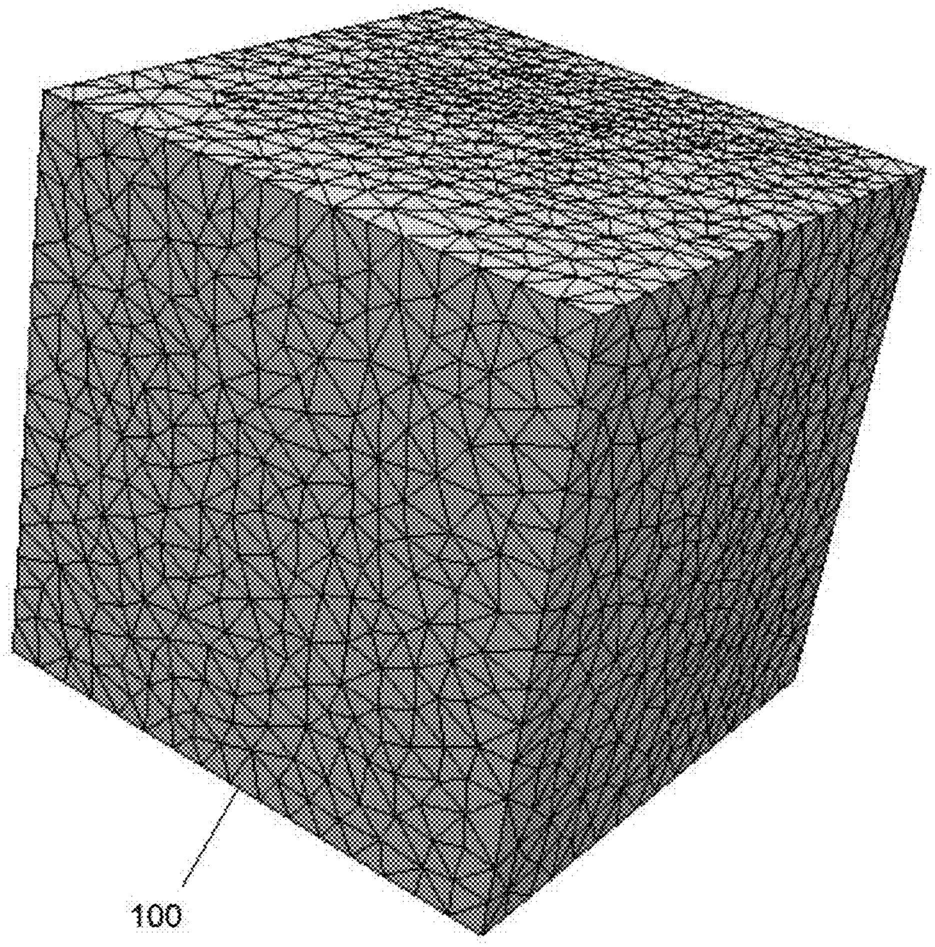
FIG. 1 is a diagram showing an example fluid model representing a fluid domain.

An example fluid model 100 is shown in FIG. 1. The example fluid model 100 covers a cubic shaped region (i.e., a fluid domain). The fluid domain can be any shape not just a cubic space. The example fluid model 100 contains tetrahedral elements. Other types of elements may be used, for example, hexahedral elements. Fluid domain can be surrounding fluid covering a large space with a physical object located therein. Fluid domain can also be fluid contained in an inner space of a physical object.

Figure 2:
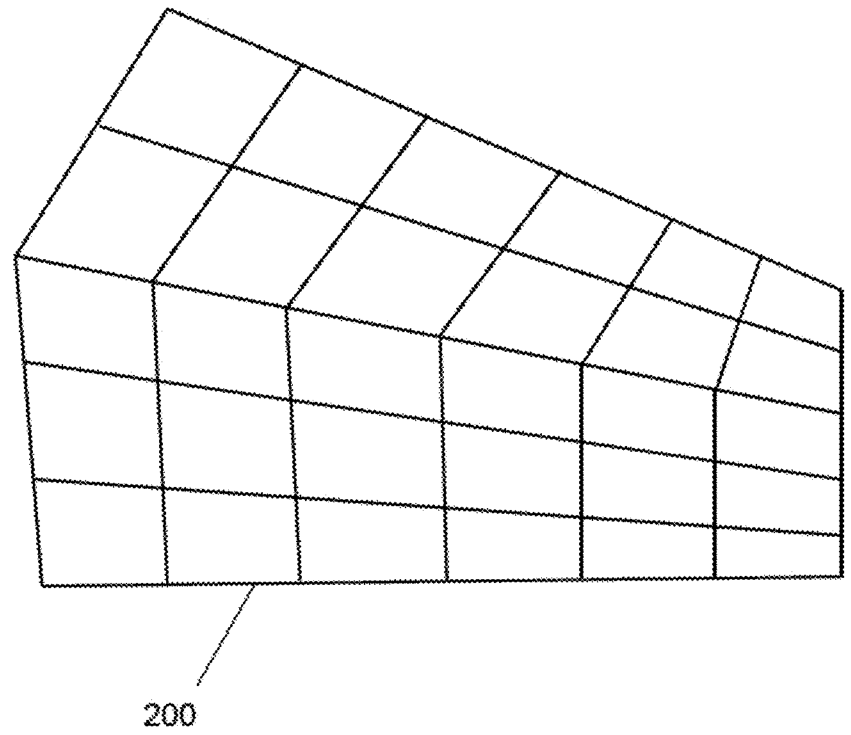
FIG. 2 is a diagram showing a structure model representing an example physical object.

FIG. 2 shows an example structure model 200 representing a physical object. The example structure model 200 contains quadrilateral shell elements. Other type shell elements may be used, for example, triangular shell elements. The example structure model 200 can represent a thin-walled physical object (e.g., fabrics, balloons, etc.). The example structure model 200 can also represent an outer surface of a solid physical object. In other embodiments, structure model may also contain beam elements for representing cables, strings, etc.

Figure 3A:
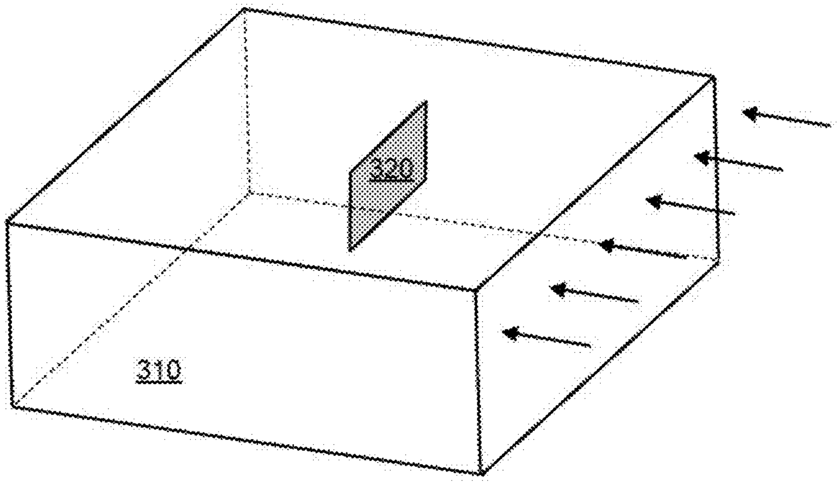
FIG. 3A is a diagram showing FSI of an example flexible object blown by wind.
Figure 3B:
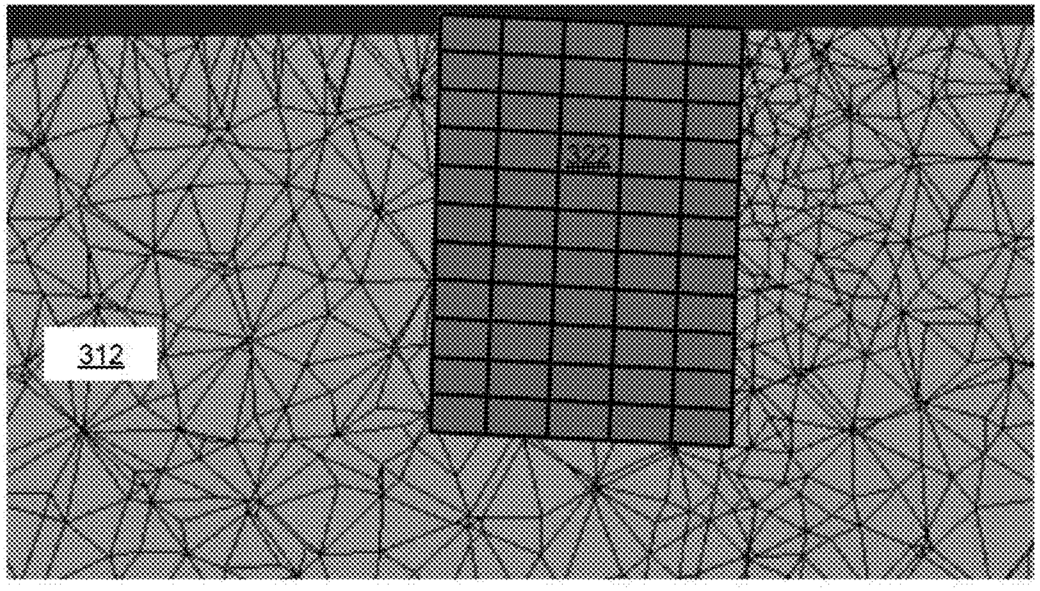
FIG. 3B is a cross-section view showing example models for simulating the FSI of FIG. 3A.

FIG. 3A shows an example fluid-structure interaction (FSI) of a physical object (i.e., a flap 320) in response to air flow (i.e., wind) of a fluid domain (i.e., air in a region 310). Wind direction is indicated by the arrows. Since the flap 320 is flexible, it can move with the wind. In order to simulate FSI, the fluid domain is represented with a fluid model 312 (e.g., tetrahedral mesh shown in FIG. 3B). The flap 320 is represented with a structure model 322 (i.e., two-dimensional element mesh shown in FIG. 3B). FIG. 3B is a cross-section view of the fluid domain 310 and the flap 320. The view angle to the cross-section is oblique to the wind direction. Further, the fluid model 312 can be a finite element analysis model. The fluid model 312 can also be a finite volume method model. The structure model 322 can be a finite element analysis model.

In this disclosure, particles used for transferring forces and displacements are specified and defined in each element in an FSI interface. Each particle has a location and a radius (i.e., a circular area in two-dimension or a spherical volume in three-dimension). In one embodiment, particles can be based on discrete element method (DEM). Each particle is located at a predefined location within each element, for example, integration point. The number of particles per element can also be predefined or specified by user.

Figure 4A:
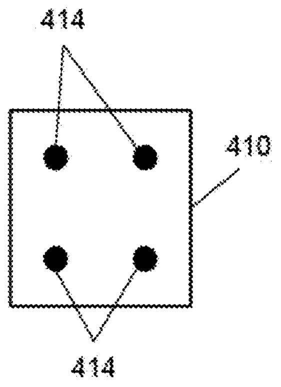
FIG. 4A is a diagram showing example particles in a two-dimensional element.
Figure 4B:
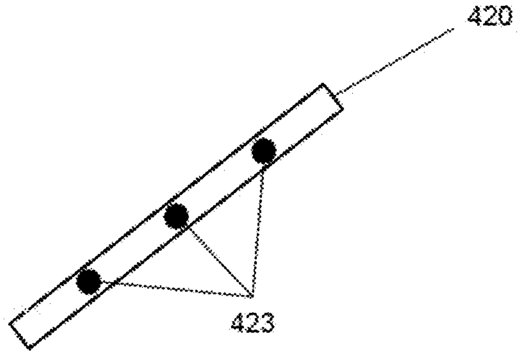
FIG. 4B is a diagram showing example particles in a one-dimensional element.

FIG. 4A shows four particles 414 in an example two-dimensional element (e.g., a quadrilateral shell element 410). In this example, the quadrilateral shell element 410 is the parent element for particles 414. FIG. 4B shows three particles 423 in an example one-dimensional element (e.g., a beam element 420) as the parent element.

Figure 4C:
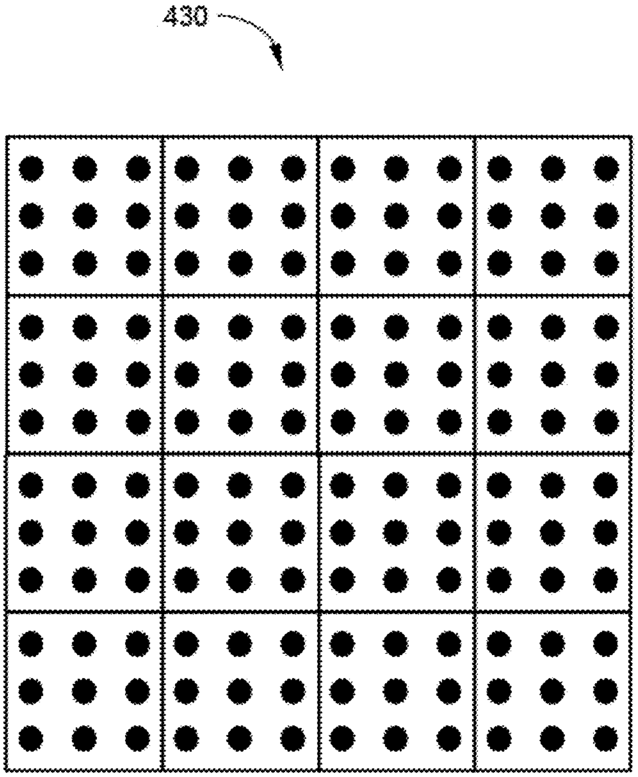
FIG. 4C is a diagram showing example particles in an FSI interface.

An example FSI interface 430 shown in FIG. 4C contains multiple quadrilateral elements with nine particles per element. In some embodiments, the FSI interface may contain only a portion of the boundary between physical object and fluid domain for limiting amount of computations. The selection of the portion can be done with many known manners, for example, by user specification.

Some of the terms used in this documents are defined as follows:

Finite Volume Method

The finite volume method (FVM) is a method for representing and evaluating partial differential equations in the form of algebraic equations. In the finite volume method, volume integrals in a partial differential equation that contain a divergence term are converted to surface integrals, using the divergence theorem. These terms are then evaluated as fluxes at the surfaces of each finite volume. Because the flux entering a given volume is identical to that leaving the adjacent volume, these methods are conservative. Another advantage of the finite volume method is that it is easily formulated to allow for unstructured meshes. The method is used in many computational fluid dynamics packages. "Finite volume" refers to the small volume surrounding each node point on a mesh.

Finite volume methods can be compared and contrasted with the finite difference methods, which approximate derivatives using nodal values, or finite element methods, which create local approximations of a solution using local data, and construct a global approximation by stitching them together. In contrast a finite volume method evaluates exact expressions for the average value of the solution over some volume, and uses this data to construct approximations of the solution within cells.

Finite Element Analysis

Finite element analysis (FEA) is a computerized method widely used in industry to model and solve engineering problems relating to complex systems. FEA derives its name from the manner in which the geometry of the object under consideration is specified. With the advent of the modern digital computer, FEA has been implemented as FEA software. Basically, the FEA software is provided with a model of the geometric description and the associated material properties at each point within the model. In this model, the geometry of the system under analysis is represented by solids, shells and beams of various sizes, which are called elements. The vertices of the elements are referred to as nodes. The model is comprised of a finite number of elements, which are assigned a material name to associate with material properties. The model thus represents the physical space occupied by the object under analysis along with its immediate surroundings. The FEA software then refers to a table in which the properties (e.g., stress-strain constitutive equation, Young's modulus, Poisson's ratio, thermo-conductivity) of each material type are tabulated. Additionally, the conditions at the boundary of the object (i.e., loadings, constraints, etc.) are specified. Boundary conditions can include known displacements at specific degree-of-freedom (DOF). Constraints may be a surface-based constraint for coupling displacements/movements of two nodes in a model. In this fashion a model of the object and its environment is created.

Discrete Element Method

A discrete element method (DEM), also called a distinct element method, is any of a family of numerical methods for computing the motion and effect of a large number of small particles. With advances in computing power and numerical algorithms for nearest neighbor sorting, it has become possible to numerically simulate millions of particles on a single processor. Today DEM is becoming widely accepted as an effective method of addressing engineering problems in granular and discontinuous materials. Each DEM particle can be defined by a location and a radius (i.e., a volume for 3-D or an area for 2-D).

Figure 5A:
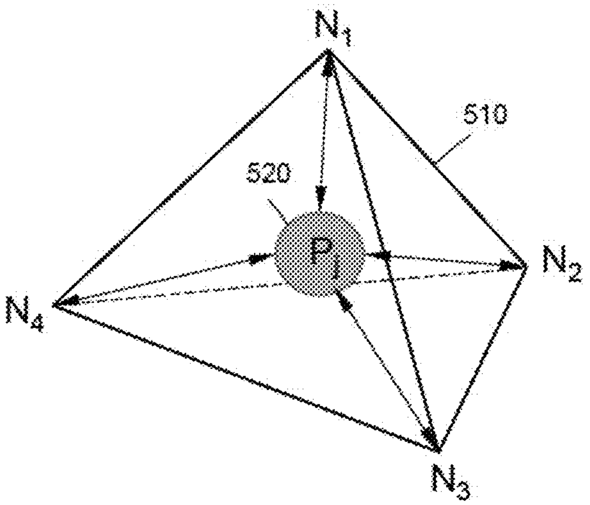
FIG. 5A is a schematic diagram showing a relationship between an example host element in a fluid model and a particle located therein.

Each particle on an FSI interface has a location, which may move to different positions in the three-dimensional space due to FSI. When the fluid model contains multiple tetrahedral elements, at each solution cycle or step, a host element of each particle is determined based on the particle's current location. Host element is one of the tetrahedral elements where a respective particle is located therein. Then the fluid friction and pressure force for each particle can be calculated from the host element. A schematic diagram depicting a particle 520 and a host tetrahedral element 510 is shown in FIG. 5A. At each particle $P_j$ 520, the force is a function of $A_p$, $r_p$, $v_f$, $\rho_f$, $\mu$, $p_f$, $Vol_p$, g, $v_p$, $C_D$, where:

$A_p$: Projected surface area of each particle, $r_p$: particle radius, $v_f$: fluid velocity, $\rho_f$: fluid density, $\mu$: fluid viscosity, $p_f$: fluid pressure, $Vol_p$: particle volume, g: gravity, $v_p$: particle velocity, $C_D$: drag coefficient of the particle for specific Reynolds number.

In one embodiment, the friction and pressure force could be computed using the drag coefficient for a particle and the buoyancy term:

$$F_p = C_D 0.5\rho_f|v_f - v_p|^2 A_p \frac{(v_f - v_p)}{|v_f - v_p|} + \rho_f Vol_p g$$

Figure 5B:
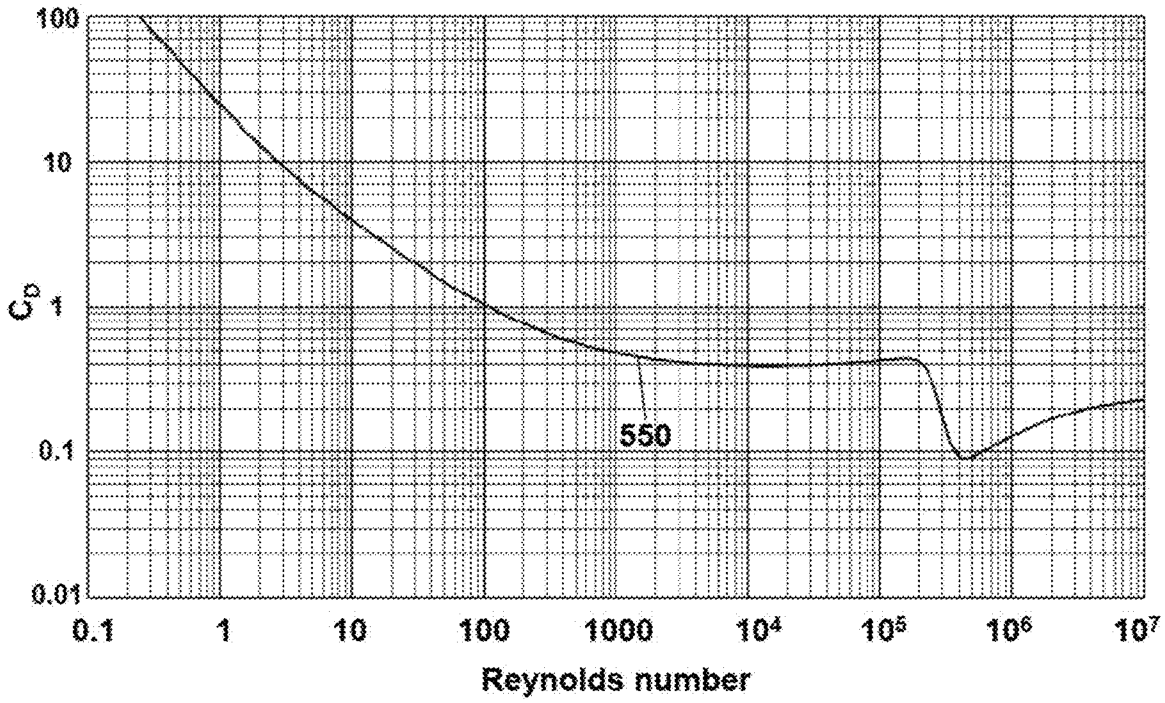
FIG. 5B is a diagram showing drag coefficient of a spherical particle versus Reynolds number.

The drag coefficient $C_D$ depends on the shape of the particle and the flow Reynolds number (Re) defined by:

$$\mathrm{Re} = \rho_f L v_f^2/\mu_f,$$

where L is a characteristic length. For spherical particles this value can be obtained from experimental or analytical curves, for example, an example curve 550 shown in FIG. 5B.

There can be more than one particle located within a host element. Calculations of the fluid friction and pressure forces are performed one particle at a time. The fluid friction and pressure forces for each particle can be calculated based on known fluid theory (e.g., Navier-Stokes equations) in a simulation.

Since the set of particles is used for representing the FSI interface, the calculated fluid friction and pressure force at each particle is the force on the FSI interface to be applied onto the structure or physical object.

Navier-Stokes Equations

The Navier-Stokes equations mathematically express conservation of momentum and conservation of mass for fluids. They are sometimes accompanied by an equation of state relating pressure, temperature and density. They arise from applying Isaac Newton's second law to fluid motion, together with the assumption that the stress in the fluid is the sum of a diffusing viscous term (proportional to the gradient of velocity) and a pressure term—hence describing viscous flow.

The Navier-Stokes equations are useful because they describe the physics of many phenomena of scientific and engineering interest. They may be used to model the weather, ocean currents, water flow in a pipe and air flow around a wing. The Navier-Stokes equations, in their full and simplified forms, help with the design of aircraft and cars, the study of blood flow, the design of power stations, the analysis of pollution, and many other things. Coupled with Maxwell's equations, they can be used to model and study magnetohydrodynamics.

For flow of Newtonian fluid with constant density and constant viscosity, the Navier-Stokes equations can be written as follows:

$$\frac{DV}{Dt} = g - \frac{1}{\rho}\nabla p + \nu\nabla^2 V$$

where:

g: gravity,

ρ is the density of the fluid,

ν is the kinematic viscosity of the fluid, p is the pressure of the fluid flow,

V is the velocity vector of the fluid flow.

Reynolds Number

The Reynolds number is the ratio of inertial forces to viscous forces within a fluid which is subjected to relative internal movement due to different fluid velocities. A region where these forces change behavior is known as a boundary layer, such as the bounding surface in the interior of a pipe. A similar effect is created by the introduction of a stream of high-velocity fluid into a low-velocity fluid, such as the hot gases emitted from a flame in air. This relative movement generates fluid friction, which is a factor in developing turbulent flow. Counteracting this effect is the viscosity of the fluid, which tends to inhibit turbulence. The Reynolds number quantifies the relative importance of these two types of forces for given flow conditions, and is a guide to when turbulent flow will occur in a particular situation.

The Reynolds number is defined as:

$$Re = \frac{uL}{v} = \frac{\rho uL}{\mu}$$

where:

ρ is the density of the fluid (SI units: $kg/m^3$)

u is the flow speed (m/s)

L is a characteristic linear dimension (m) (see the below sections of this article for examples)

μ is the dynamic viscosity of the fluid (Pa·s or $N{\cdot}s/m^2$ or kg/(m·s))

v is the kinematic viscosity of the fluid ($m^2/s$)

Figure 6:
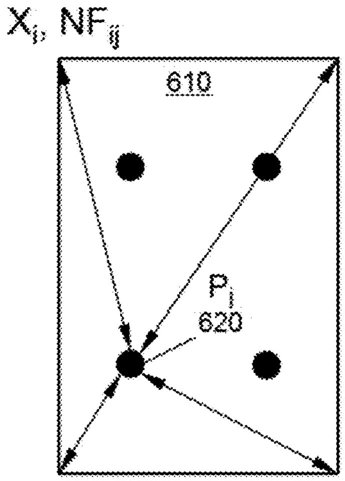
FIG. 6 is a schematic diagram showing a relationship between an example parent element in an FSI interface and particles defined therein.

Once fluid friction and pressure forces are determined for all particles on the FSI interface. The fluid friction and pressure forces for each particle can be transferred to nodes of its parent element on the FSI interface. FIG. 6 shows a relationship between a particle $P_j$ 620 and the parent element (e.g., quadrilateral shell element 610). Based on the parent element's shape function, nodal values $X_1$, $X_2$, $X_3$, $X_4$ (e.g., nodal displacements or velocities) can be interpolated to each particle (e.g., particle $P_j$620) with the following formula:

$$P_j = \sum_i (NF_{ij} * X_i)$$

where:

$NF_{ij}$ is the finite element shape function value for j-th particle.

$X_i$ is the displacement/velocity of the i-th node.

$P_j$ is the j-th particle displacement/velocity.

In this example, there are four particles so the subscript j can have an integer value between 1 and 4. The quadrilateral element has four corner nodes therefore the subscript i is between 1 and 4. If there are nine particles in a shell element, subscript j would be between 1 and 9.

After friction and pressure forces for each particle are calculated from the host element in a fluid simulation, the friction and pressure forces at each particle can be transferred to the parent element in the FSI interface as follows:

$$F_i = \frac{\Sigma_j \left[NF_{ij} * (F_f + F_p)_j\right]}{\Sigma_j NF_{ij}}$$

where $F_i$ is nodal force at the i-th node.

$(F_f+F_p)_j$ is the friction and pressure forces at the j-th particle.

$NF_{ij}$ is the finite element shape function value.

Figure 7A:
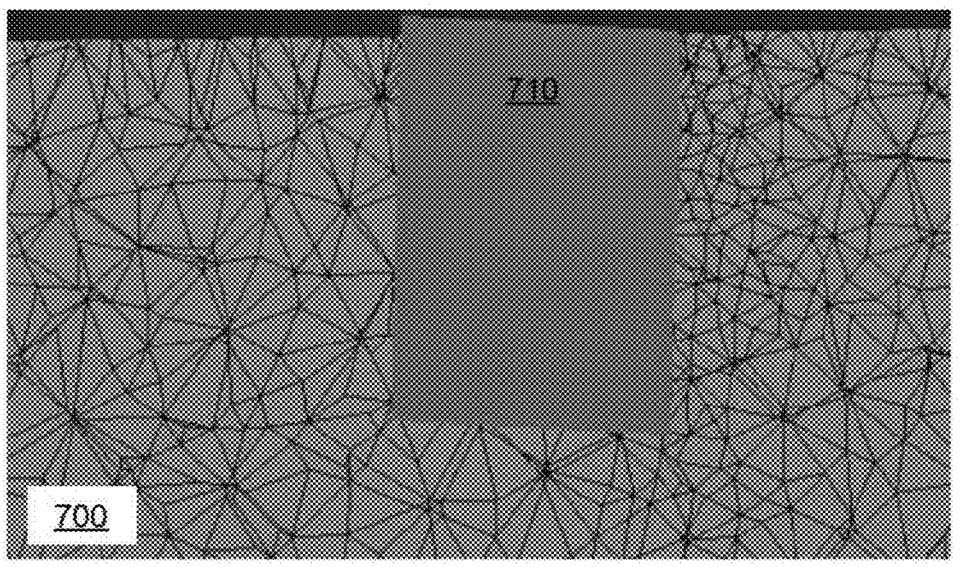
FIGS. 7A-7H show an example FSI using techniques according to this disclosure.
Figure 7B:
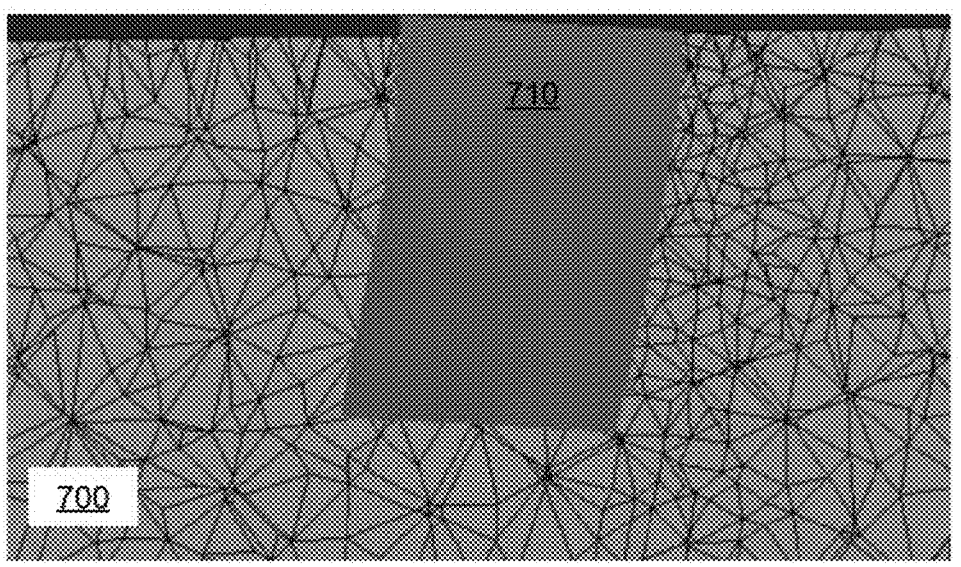
Figure 7C:
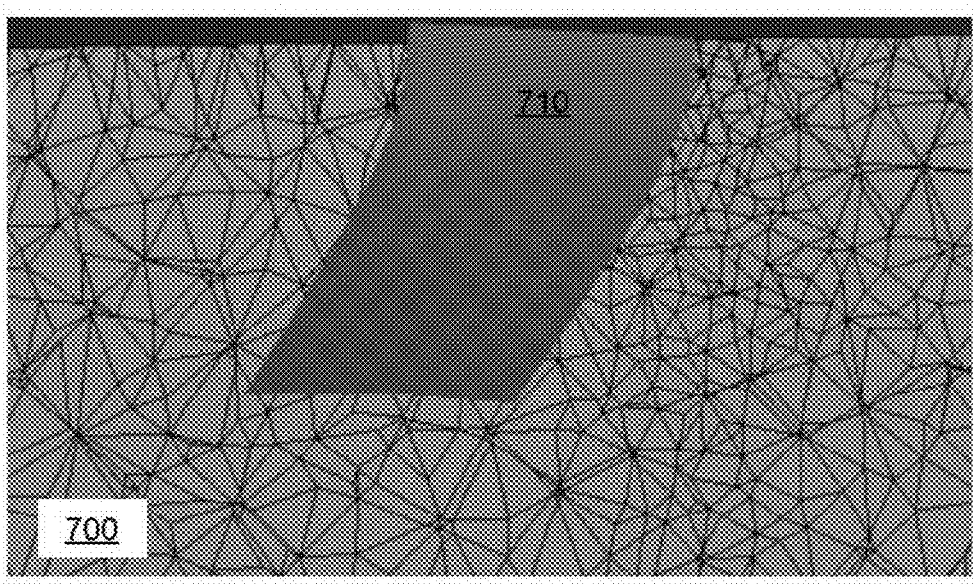
Figure 7D:
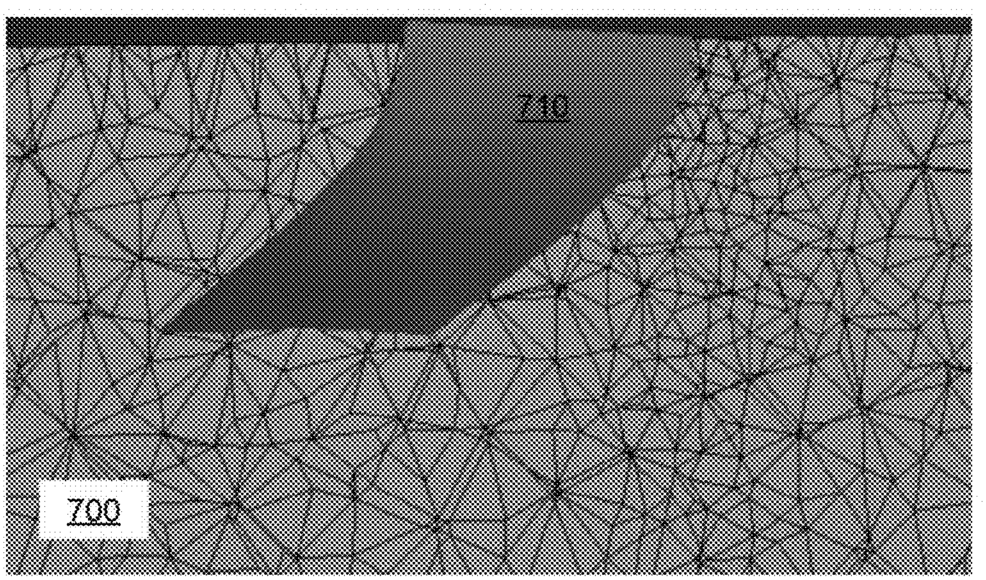
Figure 7E:
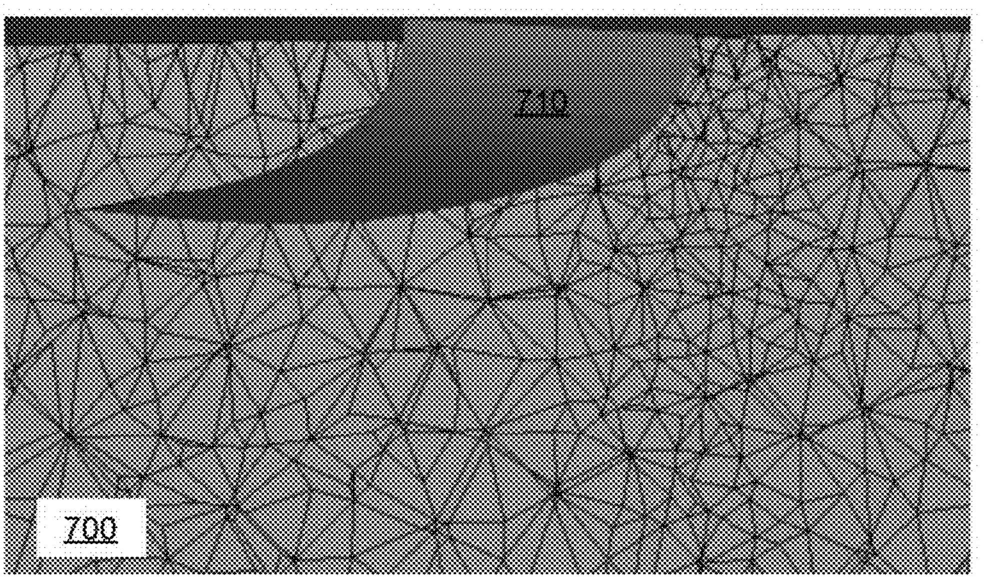
Figure 7F:
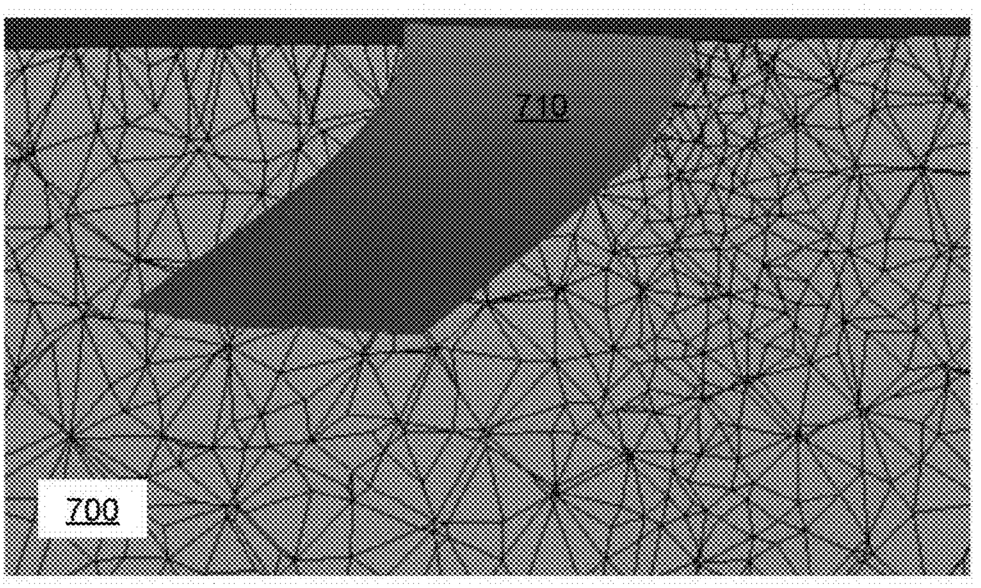
Figure 7G:
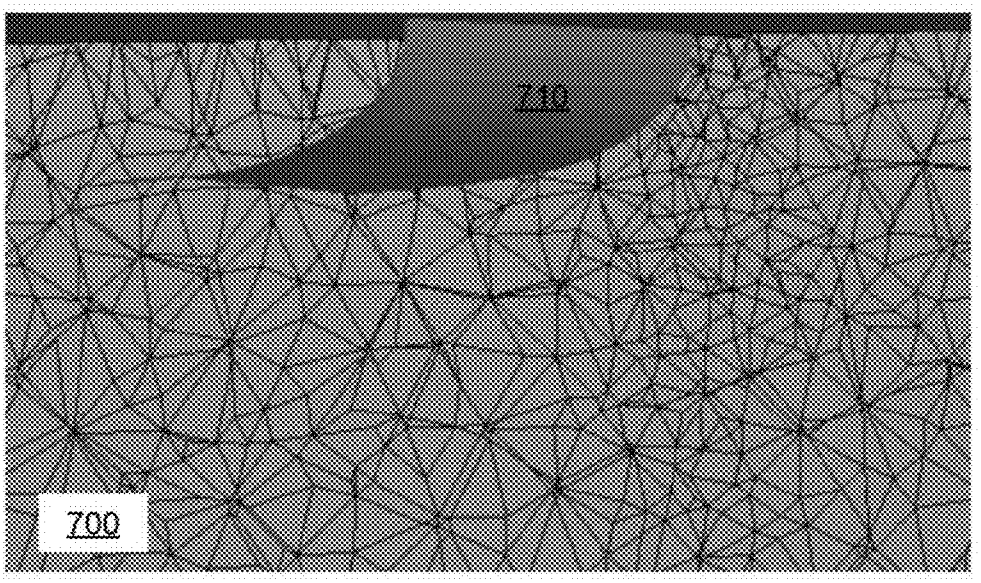
Figure 7H:
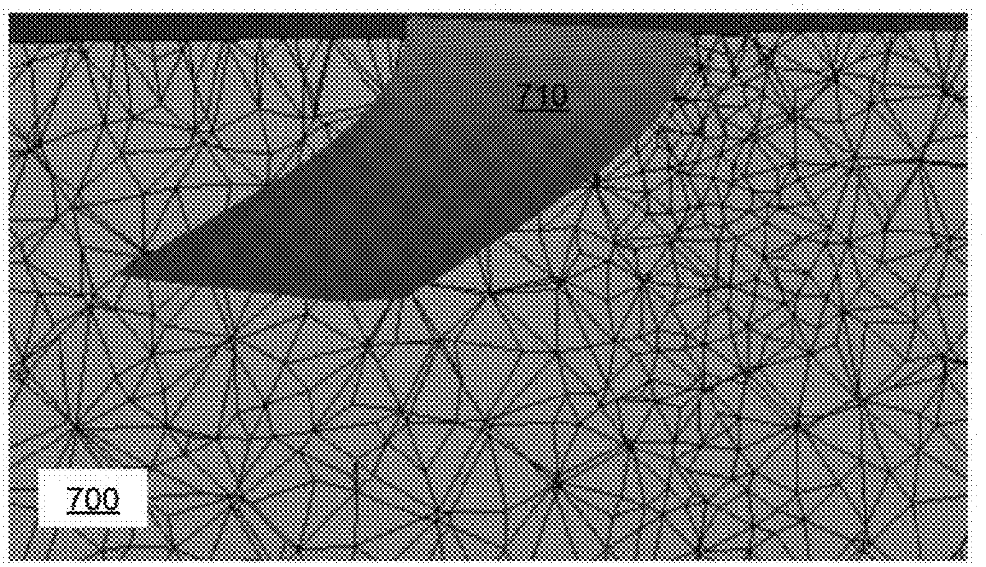

FIGS. 7A-7H show a sequence of an example FSI of a flap being blown in the wind (see FIG. 3A). The flap (i.e., physical object 710) is fixed at the top and initially at rest in an air field (i.e., fluid domain 700) at FIG. 7A. The flap 710 is then blown to an uppermost location shown at FIG. 7E. FIGS. 7B-7D show the flap 710 at three intermediate locations between the initial location and the uppermost location. The flap 710 then oscillates from the uppermost location to a lower location shown in FIG. 7F. FIGS. 7G-7H show the flap 710 in two locations in the oscillation. Due to the flexibility of the flap 710, simulations of the FSI are almost impossible with prior art approaches.

Figure 8A:
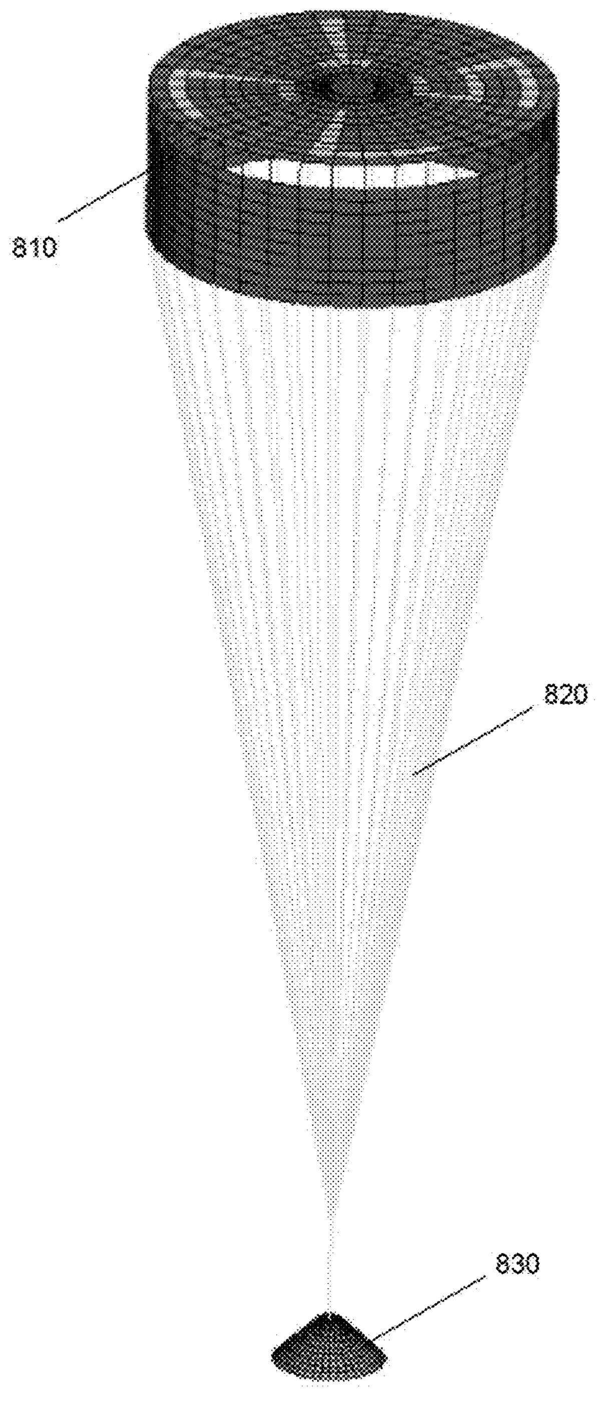
FIGS. 8A-8B show another example FSI using techniques according to this disclosure.
Figure 8B:
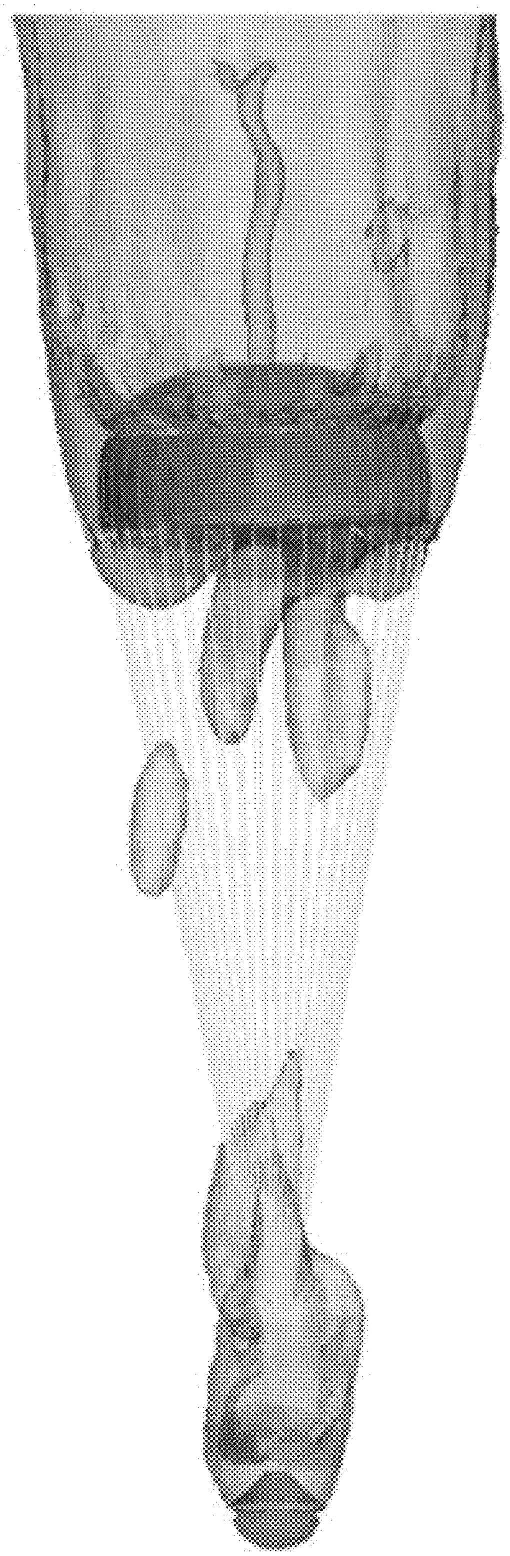

A second example FSI shown in FIGS. 8A-8B is to simulate deploying a parachute using techniques according to this disclosure. FIG. 8A shows a folded parachute 810 modelled with quadrilateral shell elements; strings 820 modelled with beam elements and a payload 830. The arrows indicate the direction of air flow. Simulated results of FSI interactions between air flow (i.e., fluid domain) and parachute (i.e., physical object) are shown in FIG. 8B. Deploying of the parachute is very difficult to simulate with prior art approaches.

Figure 9A:
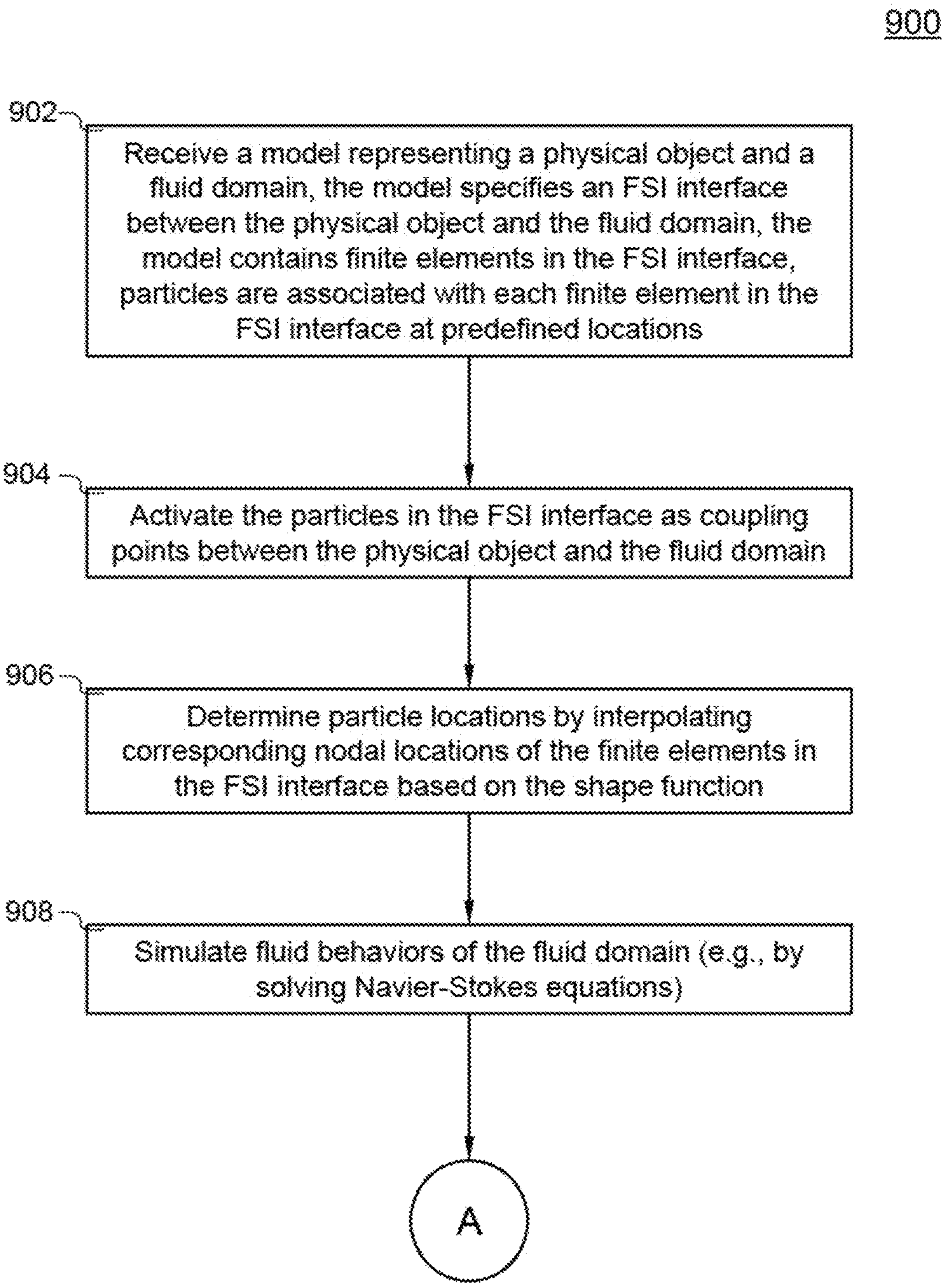
FIGS. 9A-9B collectively is a flow diagram illustrating an example process of representing an FSI interface with particles.
Figure 9B:
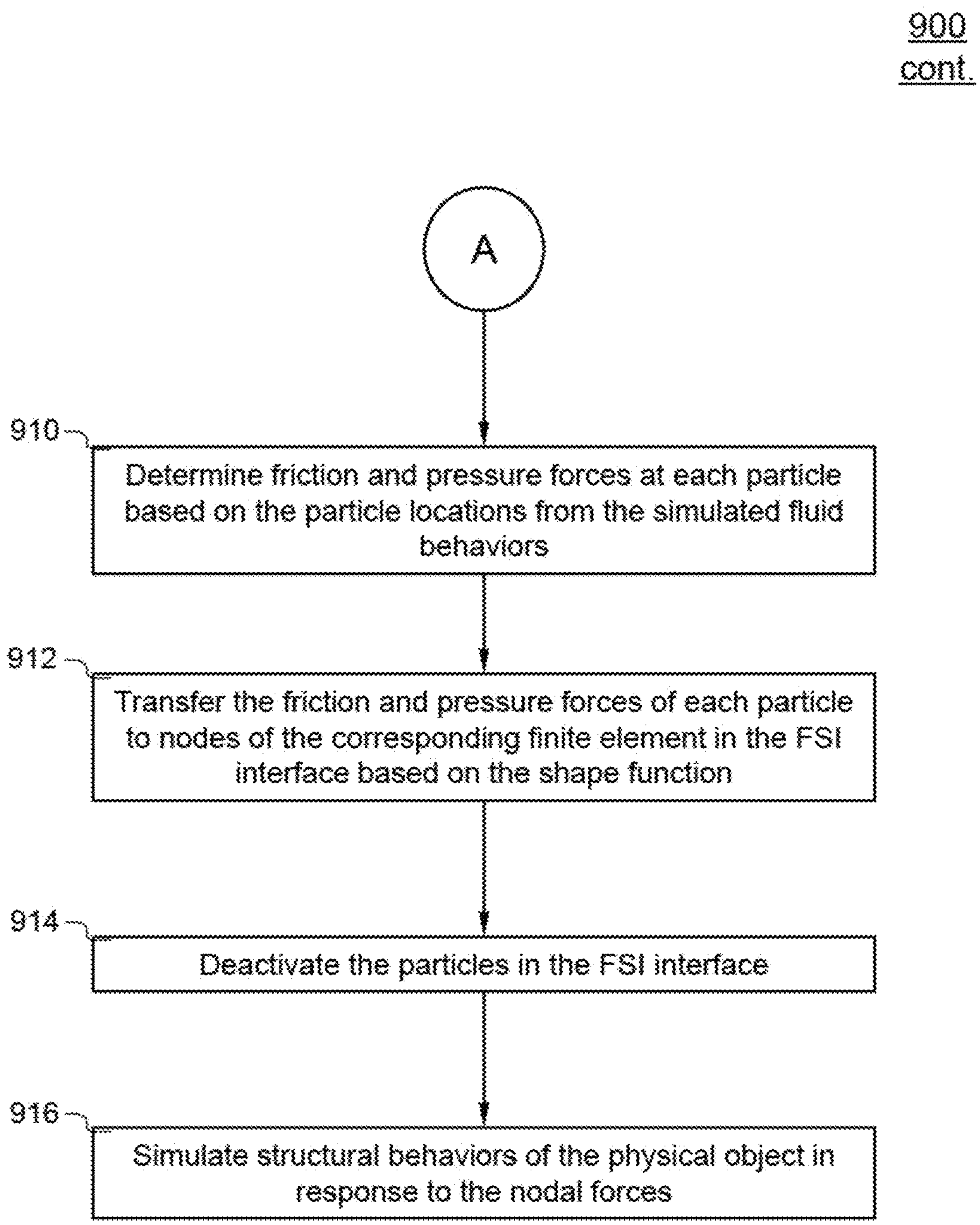

FIGS. 9A-9B collectively is a flow diagram illustrating an example process 900 of representing an FSI interface with particles (e.g., DEM particles). Process 900 starts at action 902 by receiving a model (e.g., an FEA model) representing a physical object (e.g., a structure) and a fluid domain (e.g., fluid surrounding the physical object) in a computer system (e.g., computer systems 1000, 1020 in FIGS. 10A-10B). The model further specifies a fluid-structure interaction (FSI) interface between the physical object and the fluid domain. The FSI interface can be one or more finite elements (e.g., shell elements and/or beam elements). Shell elements or two-dimensional finite elements can be the outer surface of the physical object. Beam elements or one-dimensional finite elements can be a portion of the physical object, for example, strings, cables, etc. A set of particles (e.g., one or more DEM particles) are associated with each finite element in the FSI interface. Respective particles are located at predefined locations, for example, each particle in a corresponding finite element (i.e., a parent element) can be placed at a user specified location or a default location in the corresponding finite element. The associated particles are initially inactive as if they are not in the model. There can be two portions of the model: one for the physical object and the other for the fluid domain. In some embodiments, there are two models: structure model and fluid model.

At action 904, the associated particles in the FSI interface are activated as coupling points between the physical object and the fluid domain. Next, at action 906, particle locations are determined by interpolating nodal locations (i.e., displacements) of the finite elements in the FSI interface. Shape function of a corresponding finite element can be used for calculating particle location.

At action 908, fluid behaviors of the fluid domain are obtained in a simulation. A wall boundary condition is included at particles in obtaining the simulated fluid behaviors. In one embodiment, Navier-Stokes equations are solved for determining the fluid behaviors (i.e., pressure, velocity, etc.). Friction and pressure forces of each particle can be determined based on the corresponding particle location from the simulated fluid behaviors at action 910. One example to calculate the friction and pressure forces of a particle is to find a particle host element in fluid portion of the model. The particle host element may be different for each solution step or cycle when the particle moves rapidly from one location to another.

The friction and pressure forces of each particle is then transferred to nodes of the corresponding finite element in the FSI interface at action 912. In one embodiment, shape function of the corresponding finite element is used for the transferring calculations.

At action 914, the particles are deactivated after the friction the pressure forces of the particles are converted to nodal forces of the model for the physical object. Structural behaviors of the physical object in response to the nodal forces can be obtained in a simulation (e.g., a finite element analysis) at action 916. Simulated structural behaviors include updated nodal locations which lead to updated particle locations for calculating friction and pressure forces of the particles based on simulated fluid behaviors subsequently.

Alternated simulations of the fluid domain and the physical object are performed with particles as the FSI interface for transferring forces and locations between fluid and structure.

Figure 9C:
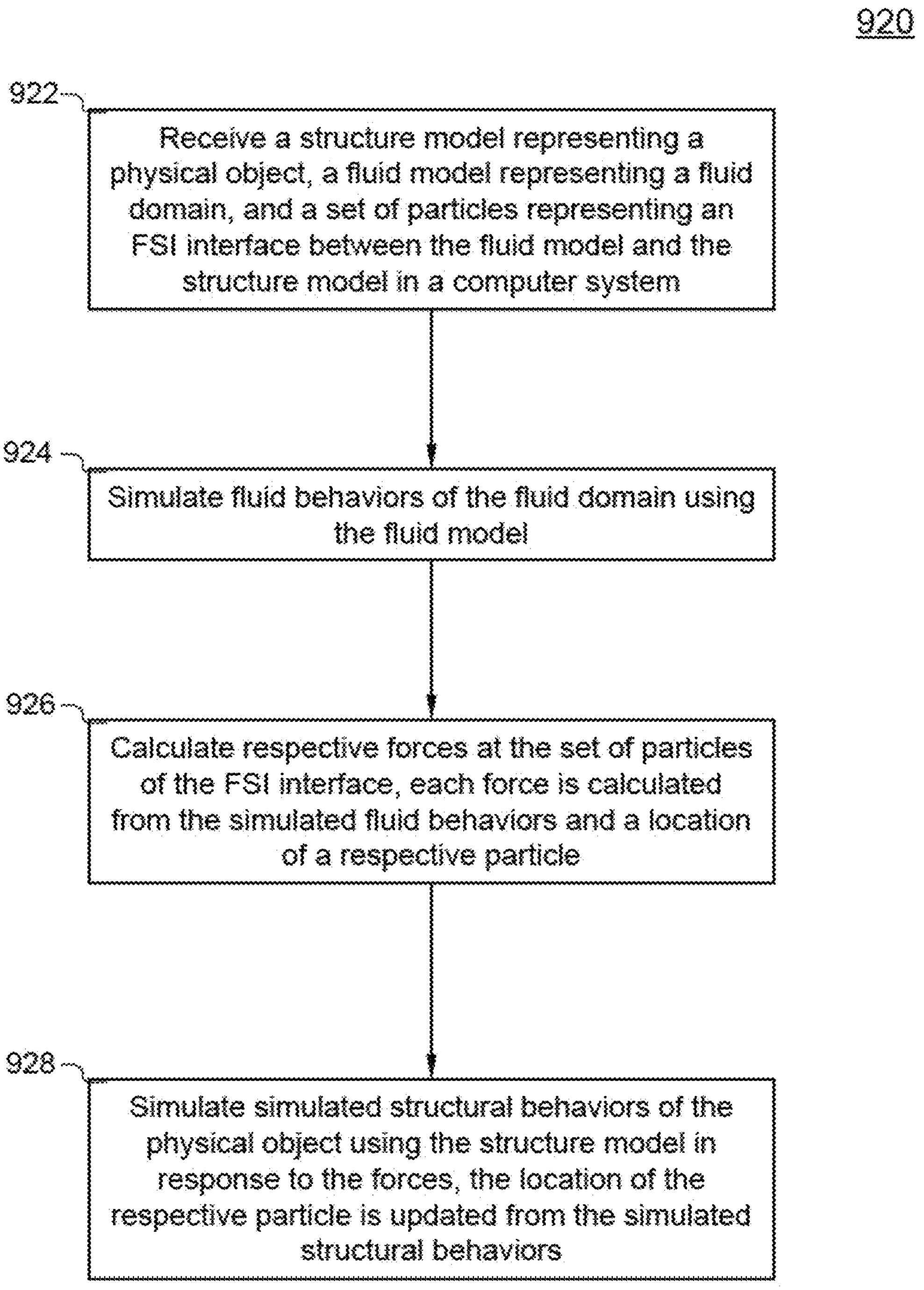
FIG. 9C is a flow diagram illustrating another example process of representing an FSI interface with particles.

FIG. 9C is a flow diagram illustrating another alternative example process 920 of representing an FSI interface with particles (e.g., DEM particles). Process 920 starts by receiving a structure model (e.g., an FEA model) representing a physical object (e.g., a structure), a fluid model representing a fluid domain (e.g., fluid surrounding the physical object), and a set of particles representing a fluid-structure interaction (FSI) interface in a computer system (e.g., computer systems 1000, 1020 in FIGS. 10A-10B) at action 922. The FSI interface is for transferring fluid forces of the particles from the fluid domain to the physical object and for transferring displacements (i.e., new locations) and velocities of the particles from the physical object to the fluid domain.

Next, at action 924, fluid behaviors of the fluid domain are simulated using the fluid model. In one embodiment, the fluid behaviors can be simulated based on known theory (e.g., Navier-Stokes equations). Then, at action 926, respective friction and pressure forces are calculated at the set of particles of the FSI interface. Each particle's friction and pressure forces are calculated from the simulated fluid behaviors and each particle's location in the fluid model. The location is used for determining the host element of each particle in the fluid model. The friction and pressure forces at each particle are then be calculated from the host element. At action 928, structural behaviors of the physical object are simulated using the structure model in response to nodal forces on the FSI interface. The nodal forces are converted from the friction and pressure forces at the set of particles on the FSI interface. Respective locations of the set of the particles are updated from the simulated structural behaviors. The updated locations are used in the subsequent calculations of friction and pressure forces.

The subject matter described herein may be implemented using any suitable processing system with any suitable combination of hardware, software and/or firmware, such as described below with reference to the non-limiting examples shown in FIGS. 10A-10D.

Figure 10A:
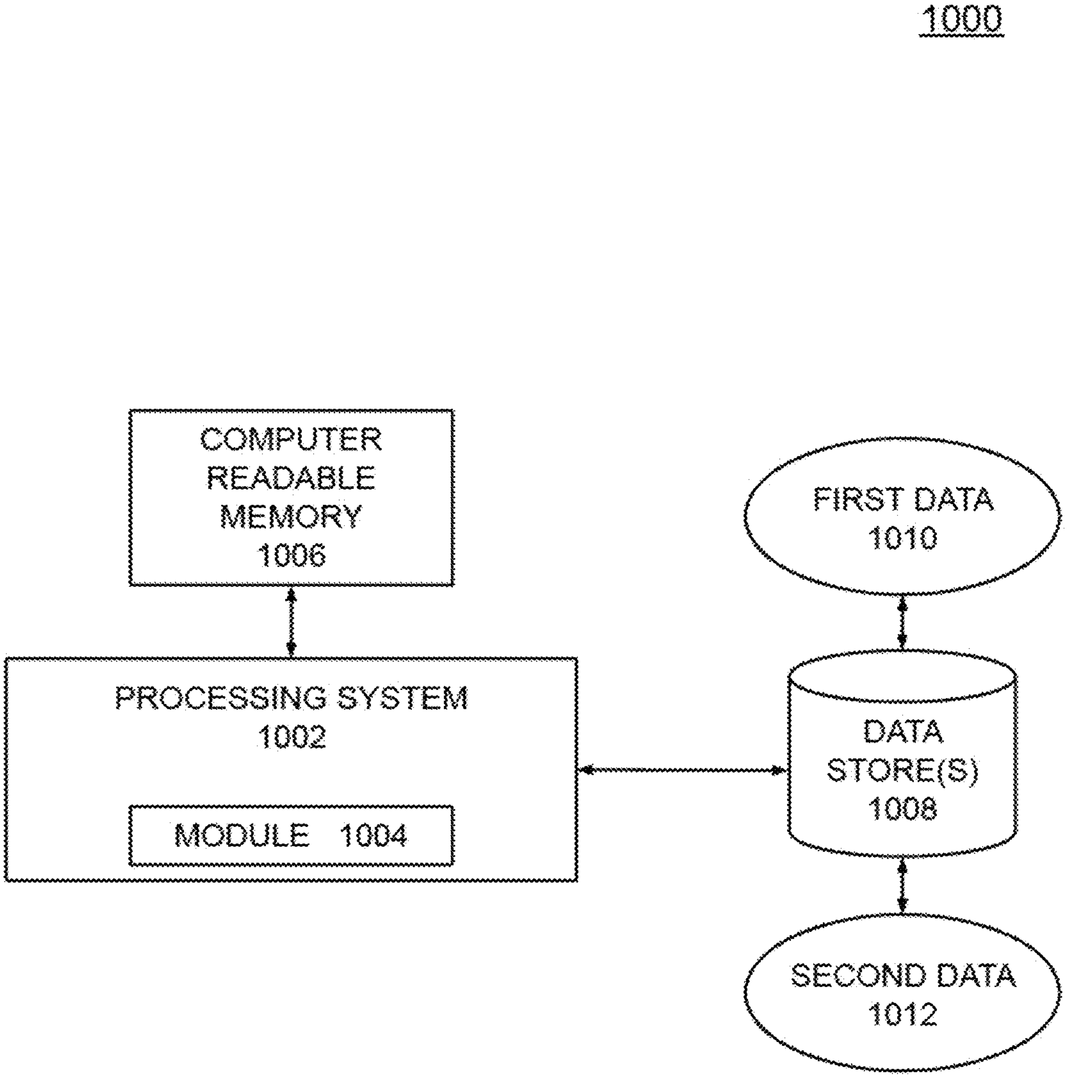
FIG. 10A is a block diagram showing an example system including a standalone computing architecture.

FIG. 10A depicts an example system 1000 that includes a standalone computer architecture where a processing system 1002 (e.g., one or more computer processors) includes a module 1004 (e.g., software module stored in memory) being executed on it. The processing system 1002 has access to a non-transitory computer-readable memory 1006 in addition to one or more data stores 1008. The one or more data stores 1008 may contain first data 1010 as well as second data 1012.

Figure 10B:
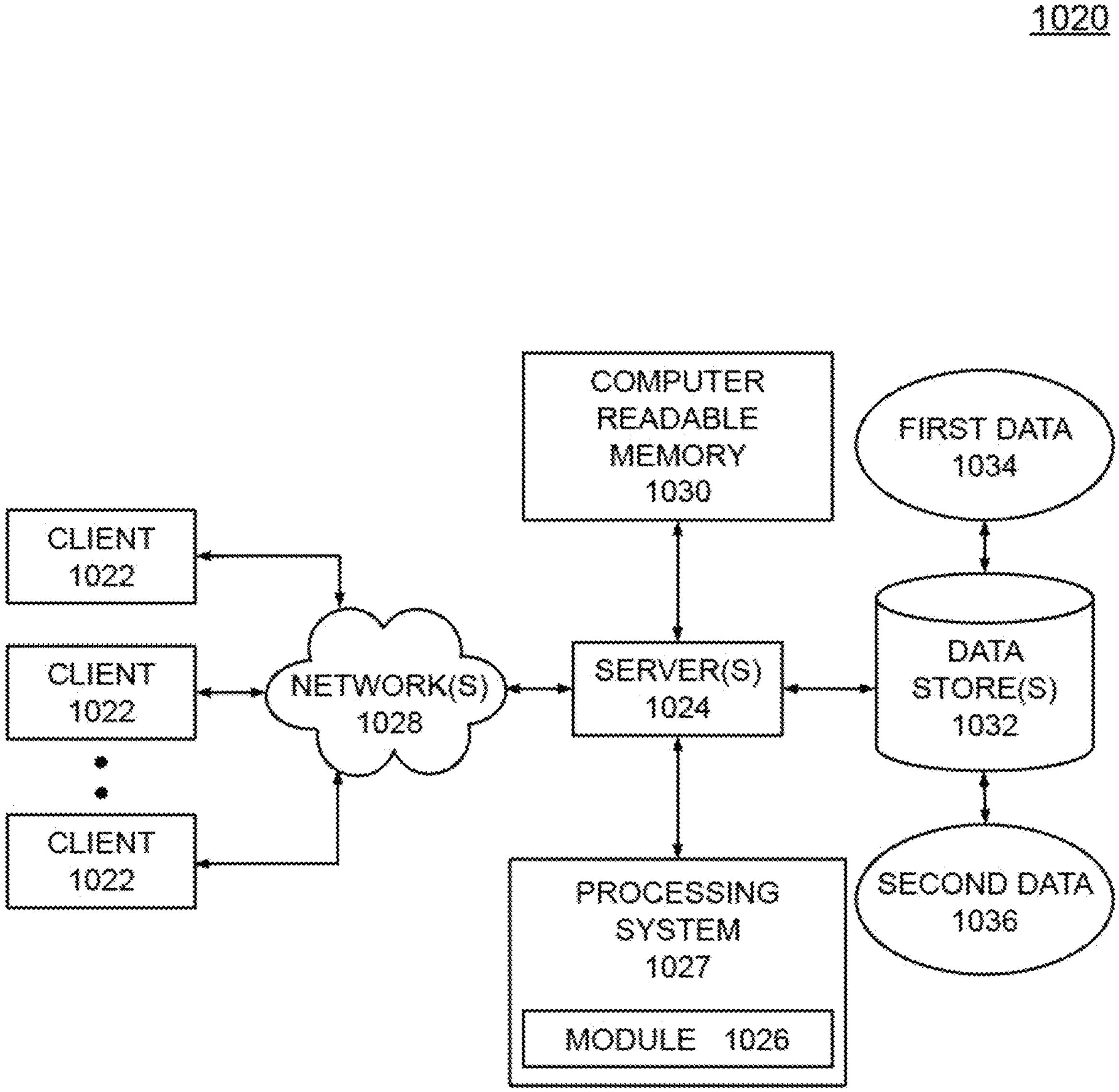
FIG. 10B is a block diagram showing an example system including a client-server computing architecture.

FIG. 10B depicts another example system 1020 that includes a client-server architecture. One or more clients 1022 (e.g., user personal computer, workstation, etc.) accesses one or more servers 1024 executing computer instructions of a module 1026 (e.g., software module stored in memory) on a processing system 1027 via one or more networks 1028. The one or more servers 1024 may access a non-transitory computer readable memory 1030 as well as one or more data stores 1032. The one or more data stores 1032 may contain first data 1034 as well as second data 1036.

Figure 10C:
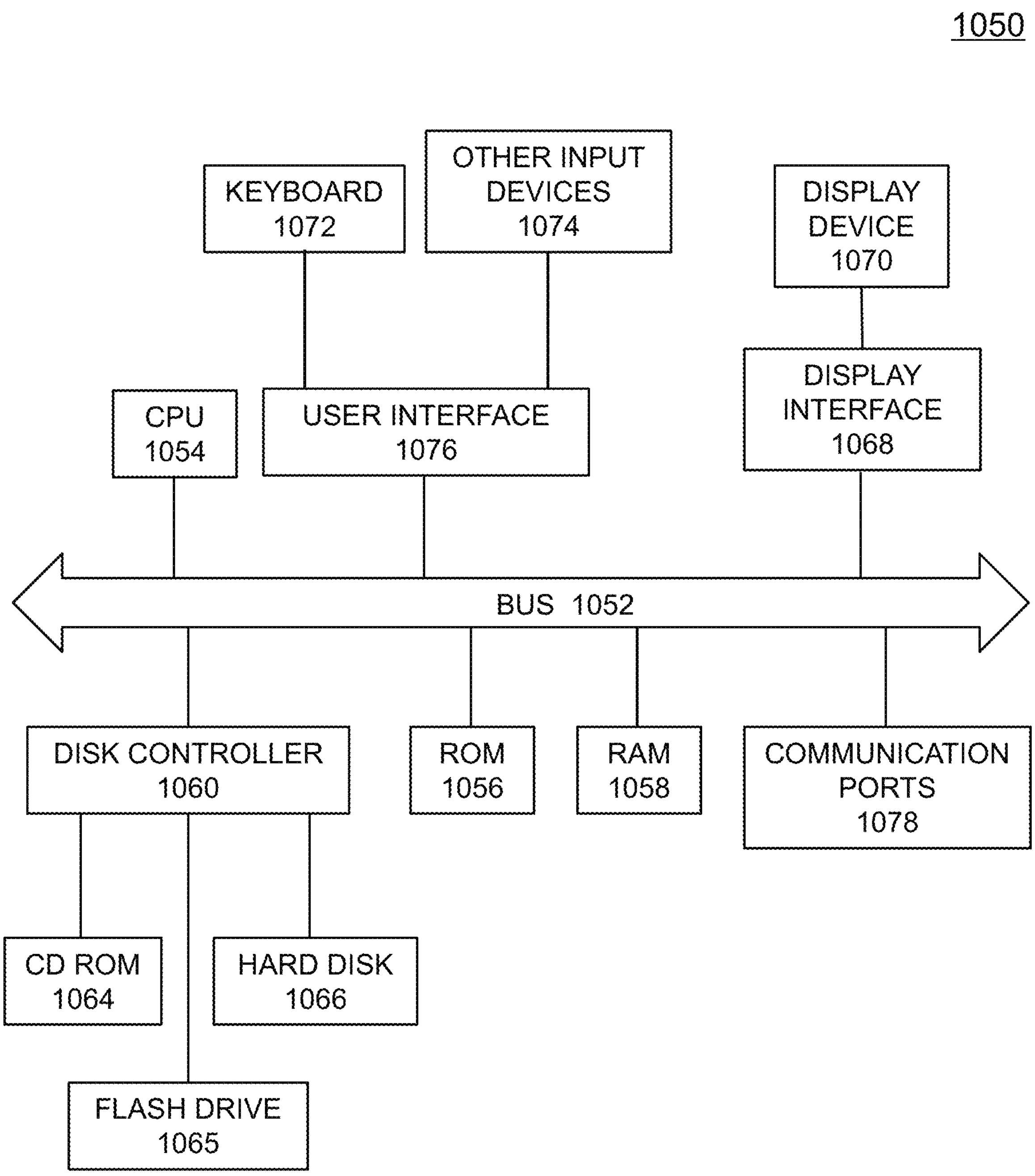
FIG. 10C is a function block diagram depicting salient components of an example computing device for implementing the subject matters described herein.

FIG. 10C shows a function block diagram of example hardware for a standalone computer architecture 1050, such as the architecture depicted in FIG. 10A, that may be used to contain and/or implement the subject matter described herein. A bus 1052 may serve as the information highway interconnecting the other illustrated components of the hardware. A processing system 1054 labeled CPU (central processing unit) (e.g., one or more computer processors), may perform calculations and logic operations required to execute a program/software/module. A non-transitory computer-readable storage medium, such as read only memory (ROM) 1056 and random access memory (RAM) 1058, may be in communication with the processing system 1054 and may contain one or more programming instructions. Optionally, program instructions may be stored on a non-transitory computer-readable storage medium such as a magnetic disk, optical disk, recordable memory device, flash memory, or other physical storage medium. Computer instructions may also be communicated via a communications signal, or a modulated carrier wave, e.g., such that the instructions may then be stored on a non-transitory computer-readable storage medium thru communication port 1078.

A disk controller 1060 interfaces one or more optional disk drives to the system bus 1052. These disk drives may be external or internal flash memory drives 1065, external or internal CD-ROM, CD-R, CD-RW or DVD drives 1064, or external or internal hard disk drives 1066. As indicated previously, these various disk drives and disk controllers are optional devices.

If needed, the processor 1054 may access each of the following components: real-time data buffer, conveyors, file input processor, database index shared access memory loader, reference data buffer and data managers. Each component may include a software application stored in one or more of the disk drives connected to the disk controller 1060, the ROM 1056 and/or the RAM 1058.

A display interface 1068 may permit information from the bus 1052 to be displayed on a display 1070 in audio, video, graphical, text, or alphanumeric format.

In addition to the standard computer-type components, the hardware may also include data input devices, such as a keyboard 1072, or other input device 1074, such as a microphone, remote control, pointer, mouse, touch screen, and/or joystick.

Figure 10D:
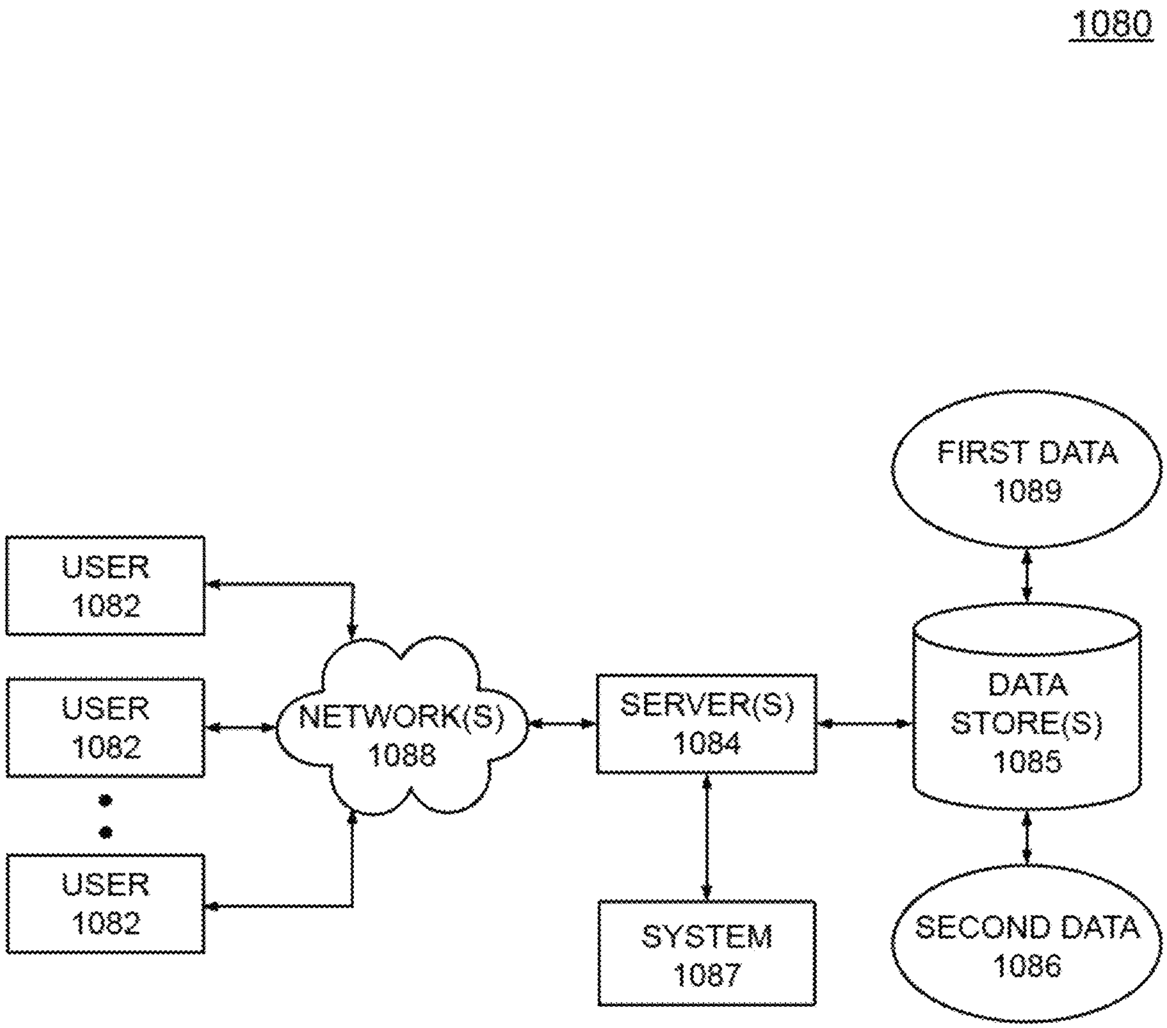
FIG. 10D is a block diagram illustrating an example computer-implemented environment.

FIG. 10D depicts a computer-implemented environment 1080 wherein users 1082 can interact with a system 1087 hosted on one or more servers 1084 through a network 1088. The system 1087 contains software operations or routines. The users 1082 can interact with the system 1087 through a number of ways, such as over one or more networks 1088. One or more servers 1084 accessible through the network(s) 1088 can host the system 1087. The processing system 1087 has access to a non-transitory computer-readable memory in addition to one or more data stores 1085. The one or more data stores 1085 may contain a first data 1089 as well as a second data 1086. It should be understood that the system 1087 could also be provided on a stand-alone computer for access by a user.

This written description describes example embodiments of the subject matter, but other variations fall within scope of the disclosure. For example, the systems and methods may include and utilize data signals conveyed via networks (e.g., local area network, wide area network, internet, combinations thereof, etc.), fiber optic medium, carrier waves, wireless networks, etc. for communication with one or more data processing devices. The data signals can carry any or all of the data disclosed herein that is provided to or from a device.

The methods and systems described herein may be implemented on many different types of processing devices by program code comprising program instructions that are executable by the device processing system. The software program instructions may include source code, object code, machine code, or any other stored data that is operable to cause a processing system to perform the methods and operations described herein. Any suitable computer languages may be used such as C, C++, Java, etc., as will be appreciated by those skilled in the art. Other implementations may also be used, however, such as firmware or even appropriately designed hardware configured to carry out the methods and systems described herein.

The systems' and methods' data (e.g., associations, mappings, data input, data output, intermediate data results, final data results, etc.) may be stored and implemented in one or more different types of computer-implemented data stores, such as different types of storage devices and programming constructs (e.g., RAM, ROM, Flash memory, flat files, databases, programming data structures, programming variables, IF-THEN (or similar type) statement constructs, etc.). It is noted that data structures describe formats for use in organizing and storing data in databases, programs, memory, or other non-transitory computer-readable media for use by a computer program.

The computer components, software modules, functions, data stores and data structures described herein may be connected directly or indirectly to each other in order to allow the flow of data needed for their operations. It is also noted that a module or processor includes but is not limited to a unit of code that performs a software operation, and can be implemented for example as a subroutine unit of code, or as a software function unit of code, or as an object (as in an object-oriented paradigm), or as an applet, or in a computer script language, or as another type of computer code. The software components and/or functionality may be located on a single computer or distributed across multiple computers depending upon the situation at hand.

It should be understood that as used in the description herein and throughout the claims that follow, the meaning of "a", "an", and "the" includes plural reference unless the context clearly dictates otherwise. Also, as used in the description herein and throughout the claims that follow, the meaning of "in" includes "in" and "on" unless the context clearly dictates otherwise. Finally, as used in the description herein and throughout the claims that follow, the meanings of "and" and "or" include both the conjunctive and disjunctive and may be used interchangeably unless the context expressly dictates otherwise; the phrase "exclusive or" may be used to indicate situation where only the disjunctive meaning may apply.

Additionally, used herein, the terms "up", and "down" are intended to provide relative positions/locations for the purposes of description, and are not intended to designate an absolute frame of reference. Further, the order of blocks in process flowcharts or flow diagrams do not inherently indicate any particular order nor imply any limitations.

Although the subject matter has been described with reference to specific embodiments thereof, these embodiments are merely illustrative, and not restrictive of, the invention. Various modifications or changes to the specifically disclosed example embodiments will be suggested to persons skilled in the art. Whereas, finite element analysis has been shown and described for obtaining simulated fluid behaviors, other technique may be used for achieving the same, for example, finite volume method. Additionally, whereas incompressible fluid flow has been shown and described for fluid domain, other types of flow may be used, for example, compressible fluid flow. In summary, the scope of the subject matter should not be restricted to the specific example embodiments disclosed herein, and all modifications that are readily suggested to those of ordinary skill in the art should be included within the spirit and purview of this application and scope of the appended claims.

What is claimed is:

1. A computer-implemented method comprising:

(a) receiving a structure model representing a physical object, a fluid model representing a fluid domain, and a set of particles representing a fluid-structure interaction (FSI) interface between the fluid model and the structure model, wherein the set of particles are located on an outer surface of the structure model at predefined locations, and each predefined location is within a corresponding finite element, the corresponding finite element being a parent element for the one or more particles located therein, (b) activating the set of particles as coupling points between the structure model and the fluid model, and determining locations for each particle of the set of particles based upon an interpolation of the corresponding finite element (c) obtaining respective forces at the set of particles of the FSJ interface, simulating fluid behaviors of the fluid domain using the fluid model while the set of particles are activated;

wherein obtaining the respective forces comprises, for each particle of the set of particles, identifying a host element in the fluid model based on a current location of the particle by traversing the fluid model, the host element being one element of a plurality of elements of the fluid model, wherein the particle is located, and ascertaining a force from fluid behaviors of the host element and the determined location of the particle.

2. The method of claim 1, wherein the nodal forces are associated with the corresponding finite element based on the interpolation of the corresponding finite element.

3. The method of claim 1, wherein the fluid model comprises a finite element analysis model.

4. The method of claim 1, wherein the fluid model comprises a finite volume method model.

5. The method of claim 1, wherein each particle comprises a radius.

6. The method of claim 5, wherein the set of particles comprises discrete element method particles.

7. The method of claim 1, wherein the obtaining the respective forces comprising further comprises updating the fluid model, wherein the host element of each particle is re-determined based on an updated current location of the particle at a subsequent iteration of the simulating of the fluid behaviors.

8. The method of claim 1, wherein the fluid behaviors comprises fluid velocities and pressures of a fluid flow in the fluid domain.

9. The method of claim 1, wherein said respective forces comprise friction and pressure drag forces, wherein the friction and pressure drag forces for each particle are calculated based on a projected surface area of the particle, a particle radius, a fluid velocity, a fluid density, and a drag coefficient of the particle.

10. The method of claim 1, wherein the simulating the structural behaviors comprising updating the structure model.

* * * * *